United States Patent
Janzen et al.

(10) Patent No.: US 9,719,735 B2
(45) Date of Patent: Aug. 1, 2017

(54) HEAT EXCHANGER

(71) Applicant: MAHLE International GmbH, Stuttgart (DE)

(72) Inventors: Caroline Janzen, Stuttgart (DE); Michael Moser, Ellwangen (DE); Heiko Neff, Auenwald (DE)

(73) Assignee: MAHLE International GmbH, Stuttgart (DE)

( * ) Notice: Subject to any disclaimer, the term of this patent is extended or adjusted under 35 U.S.C. 154(b) by 230 days.

(21) Appl. No.: 14/598,540

(22) Filed: Jan. 16, 2015

(65) Prior Publication Data
US 2015/0204620 A1    Jul. 23, 2015

(30) Foreign Application Priority Data
Jan. 17, 2014  (DE) .......................... 10 2014 200 864

(51) Int. Cl.
*F28F 9/02* (2006.01)
*B23P 15/26* (2006.01)
*F28F 9/18* (2006.01)

(52) U.S. Cl.
CPC ............... *F28F 9/02* (2013.01); *B23P 15/26* (2013.01); *F28F 9/0243* (2013.01); *F28F 9/18* (2013.01); *F28F 2225/08* (2013.01); *Y10T 29/4935* (2015.01)

(58) Field of Classification Search
CPC ............. F28F 9/0243; F28F 2009/0285; F28F 9/0209; F28F 9/162
USPC .......................... 165/173, 175, 174; 285/419; 29/890.032, 890.036, 890.037, 890.04, 29/890.043
See application file for complete search history.

(56) References Cited

U.S. PATENT DOCUMENTS

| 5,363,911 | A | * | 11/1994 | Velluet | F28F 9/0212 165/173 |
| 5,898,996 | A | * | 5/1999 | Buchanan | B21D 28/28 29/890.052 |
| 8,757,248 | B2 | * | 6/2014 | Postma | F28D 7/0041 165/158 |
| 2001/0004010 | A1 | | 6/2001 | Halm | |
| 2002/0057941 | A1 | * | 5/2002 | Nakajima | F16L 41/00 403/230 |
| 2013/0014915 | A1 | | 1/2013 | Hirsch et al. | |

FOREIGN PATENT DOCUMENTS

| DE | 101 12 697 A1 | 9/2002 |
| DE | 10 2011 079 091 A1 | 1/2013 |
| WO | WO 2007/048889 A1 | 5/2007 |

* cited by examiner

*Primary Examiner* — Ryan J Walters
*Assistant Examiner* — Mark L Greene
(74) *Attorney, Agent, or Firm* — Muncy, Geissler, Olds & Lowe, P.C.

(57) ABSTRACT

A heat exchanger, particularly for a motor vehicle, having a tube/fin bundle with tubes, through which a coolant can flow, and having at least one manifold into which the coolant, coming out of the tubes, can flow, whereby the at least one manifold has a manifold top part and a manifold bottom part, whereby outwardly extending protrusions, which form a passage geometry for receiving the tubes of the tube/fin bundle, are formed on the manifold top part and the manifold bottom part.

10 Claims, 6 Drawing Sheets

HEAT EXCHANGER

This nonprovisional application claims priority to German Patent Application No. DE 10 2014 200 864.6, which was filed in Germany on Jan. 17, 2014, and which is herein incorporated by reference.

BACKGROUND OF THE INVENTION

Field of the Invention

The present invention relates to a heat exchanger, particularly for cooling and/or for heating assemblies and/or structural components in motor vehicles and/or particularly for the temperature control of battery systems in electric and/or hybrid vehicles.

Description of the Background Art

In many technical fields, heat exchangers are generally used for cooling and/or heating assemblies and/or structural components. Heat exchangers are employed particularly in the automotive sector, when thermal energy accumulates in the internal combustion engine of a motor vehicle, for example, and must be removed. The thermal energy can be removed from the area of the internal combustion engine by means of a heat exchanger and used for the climate control, particularly for the heating, of a passenger compartment of the motor vehicle.

DE 101 12 697 A1 relates to a heat exchanger, particularly for a motor vehicle, with at least one fin-and-tube block and collection chambers having segments in each case associated with the ends of the tubes. Adjacent segments have connecting regions which can be inserted into one another and are formed in the shape of a truncated cone.

DE 10 2011 079 091 A1, which corresponds to US 20130014915, which is incorporated herein by reference, and which discloses an accumulator for a cooling fluid with a floor. The floor has an interface for connecting a chamber of the accumulator with at least one cooling tube. The floor further has an opening that extends at least over a partial area of the chamber, whereby a lid is formed to close the opening of the floor fluid-tight, whereby the lid is formed as a wire or extrusion profile. The accumulator can be used in a heat exchanger, in which a cooling fluid is introduced into the accumulator through a first connection, is guided from the accumulator through the at least one cooling tube to a diverter accumulator, is guided back from the diverter accumulator to the accumulator through at least one second cooling tube, and is again guided out of the accumulator through a second connection.

US 2001/0004010 A1 relates to a heat exchanger with two manifolds. The manifolds are made as two parts and are held together by a bracket. The bracket has a semicircular portion that surrounds the manifold. The heat exchanger can be attached to a column of a motor vehicle by a second portion. The first portion has protrusions which engage with recesses on the manifold and fix the bracket in its position on the manifold.

SUMMARY OF THE INVENTION

It is therefore an object of the present invention to provide a heat exchanger with an improved manifold.

In an exemplary embodiment of the invention, a heat exchanger, particularly for a motor vehicle, has a tube/fin bundle with tubes through which a coolant can flow, furthermore with at least one manifold into which the coolant can flow out of the tubes. The at least one manifold has a manifold top part and a manifold bottom part, whereby outwardly extending protrusions forming a passage geometry for receiving the tubes of the tube/fin bundle, are formed on the manifold top part and the manifold bottom part.

It is especially advantageous in this case, if the manifold top part and the manifold bottom part each have a row of outwardly extending protrusions, which each form a side of the passage geometry of openings for receiving the tubes. The opening and particularly the passage geometry can thereby be jointly formed by protrusions of manifold top part and manifold bottom part.

The manifold top part and the manifold bottom part can be produced from two tailored blanks bent into round shapes. The outwardly extending protrusions can be arranged on the tailored blanks. The outwardly extending protrusions can be hereby arranged along the longitudinal extension direction of the manifold, especially along the entire longitudinal extension of the manifold. Wall sections of the manifold top part for the manifold top part and wall sections of the manifold bottom part for the manifold bottom part can be arranged between the outwardly extending protrusions. The outwardly extending protrusions, as it were, can be an upwardly bent wall section of the manifold top part for the manifold top part and an upwardly bent wall section of the manifold bottom part for the manifold bottom part. The outwardly extending protrusions form surface elements. The outwardly extending protrusions hereby form a substantially horizontal protrusion section. The outwardly extending protrusions point away from the manifold wall. The outwardly extending protrusions can be substantially radially outwardly extending protrusions. The manifold top part and the manifold bottom part can overlap in areas. The material of the manifold top part and the manifold bottom part can be aluminum, a plastic, a brass compound, or some other suitable material. In this regard, the manifold top part can be made of the same material as the manifold bottom part. The manifold top part and the manifold bottom part can also be made of different materials. The manifold bottom part and the manifold top part are connected non-detachably by a joining technique known per se, for example, by a soldering process or by gluing. A process-reliable joining process in the case of nonhomogeneous materials can also be assured by the geometric design of the manifold in the manifold bottom part and the manifold top part. The manifold can be assembled simply and securely by pushing the manifold top part and the manifold bottom part into one another. The manifold top part and the manifold bottom part can be twisted simultaneously against each other. Alternatively, the manifold top part and the manifold bottom part can also be first pushed into one another and then twisted against one another. A fixed connection can be produced before the actual joining process by the mutual engagement of the outwardly extending protrusions and the interaction of the protrusions and the interspaces. The assembly occurs in one process step; no additional positioning step has to be provided.

In an embodiment of the heat exchanger, the outwardly extending protrusions are separated from one another by interspaces having wall sections of the manifold top part and/or the manifold bottom part.

Thus, the outwardly extending protrusions may have a reproducible distance defined by the interspaces. The distance of the protrusions can hereby correspond to the distance of the tubes in the tube/fin bundle.

The dimensions of the interspaces, viewed in the longitudinal extension of the manifold, can be smaller than the dimensions of the protrusions.

The tubes can be flat tubes. Alternatively, the tubes can also have a circular or oval cross-sectional form. However, any other cross section geometry is also possible, whereby the tubes viewed in cross section have a perimeter bounded by a polygonal line.

The at least one manifold can have partition walls which are arranged substantially perpendicular to a longitudinal extension direction of the at least one manifold.

In this case, the partition walls can be inserted in slot-shaped recesses or cut-outs in the manifold wall. The slot-shaped recesses are preferably arranged on the perimeter of the manifold as slots and run in the manifold wall in the area of the interspaces.

In this regard, punched slots in the manifold top part can be covered by a wall element of the manifold bottom part and punched slots in the manifold bottom part can be covered by a wall element of the manifold top part. In this way, the heat exchanger can be fluid-tight because of terminal partition walls. In particular, the coolant flow can also be guided by the partition walls. Thus, different flow and distribution forms can be realized.

The object is also achieved with an assembly process for a heat exchanger with a tube/fin bundle and at least one manifold, whereby the assembly comprises the steps of arranging a manifold top part and a manifold bottom part, whereby the manifold top part is arranged relative to the manifold bottom part around an extension axis of the manifold, pushing into one another and preferably simultaneously radially twisting the manifold top part and the manifold bottom part, namely, until a passage geometry has been created, and fixing an end position of the manifold bottom part and of the manifold bottom part.

The fixing of the manifold top part and of the manifold top part can occur in such a way that the outwardly extending protrusions of the passage geometry of the manifold top part and of the manifold bottom part are spaced apart in such a way that the distance corresponds to the diameter of the tubes of the tube/fin bundle.

In an embodiment of the assembly process, the fixing can occur, for example, by gluing or soldering.

As a result, a simple and secure assembly of the heat exchanger, particularly of the manifold, is made possible. No additional and separate positioning of the manifold top part and of the manifold bottom part before the subsequent joining process is necessary. During the gluing-joining process, the curing of the adhesive compound can occur in a subassembly with sufficient basic mechanical stability, whereby the subassembly is preferably formed by the manifold top part and the manifold bottom part. In the soldering joining process, the soldering and cooling of the solder can occur with a sufficient basic stability of the subassembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
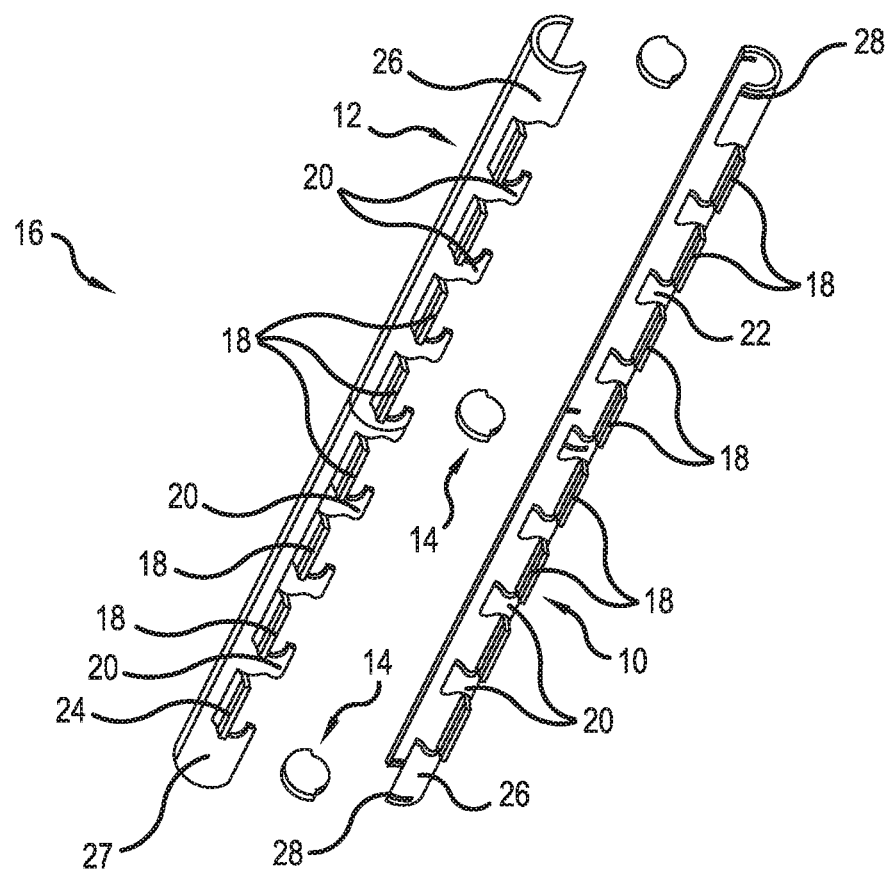
FIG. 1 shows a manifold top part and a manifold bottom part in a schematic perspective illustration.

FIG. 1 shows a manifold bottom part 10 and a manifold top part 12 and partition walls 14. Manifold bottom part 10 and manifold top part 12 in the assembled state form a manifold 16 of a heat exchanger, particularly for a motor vehicle. Partition walls 14 can be inserted in manifold bottom part 10 in order to enable fluid guidance and flow paths in manifold 16.

Manifold bottom part 10 and manifold top part 12 have outwardly extending protrusions 18. Wall sections 20, which form an interspace 22 between adjacent outwardly extending protrusions 18, are arranged between outwardly extending protrusions 18. Outwardly extending protrusions 18 have rectangular surface elements 24. Outwardly extending protrusions 18 are bent at an angle away from a wall 26 or wall 27. Preferably, surface elements 24 form an angle of approximately 90° with wall 26 or wall 27. The angle can preferably be between 60° and 110°. Surface element 24 in this case can be made planar, but it can also have a curved form or bent form. Outwardly extending means that protrusions 18 with their surface element 24 are not arranged in an extension to wall 26 or 27, but extend outwards, therefore away from wall 26 or wall 27. Outwardly extending protrusions 18 are preferably radially outwardly extending protrusions 18. Outwardly extending protrusions 18, arranged opposite each other, each form a passage. The passage therefore is an outwardly extending passage. The arrangement of passages along an extension direction 30 of manifold top part 12 and of manifold bottom part 10 each forms a side of the passage geometry for the assembly of the tubes, particularly flat tubes.

Manifold bottom part 10 has slot-shaped recesses 28, into which partition walls 14 can be pushed. Slot-shaped recesses 28 are preferably arranged in the particular wall sections 20. Especially preferably, slot-shaped recesses 28 are arranged in wall 26 of manifold bottom part 10, namely, where partition walls 14 are to be arranged, in order to realize flow paths.

Manifold 16 can also be called a round header. In this case, manifold bottom part 10 and manifold top part 12 are each formed as a half-shell 10, 12. In this case, a partition plane between half-shells 10 and 12 is arranged substantially parallel to a plane in which the tubes, for example, flat tubes, can be arranged between protrusions 18 and thereby in the passages formed by two protrusions 18 each. The passage for assembling the tubes, for example, flat tubes, is formed by the opposite arrangement and thereby the interaction of manifold top part 12 with manifold bottom part 10.

Figure 2:
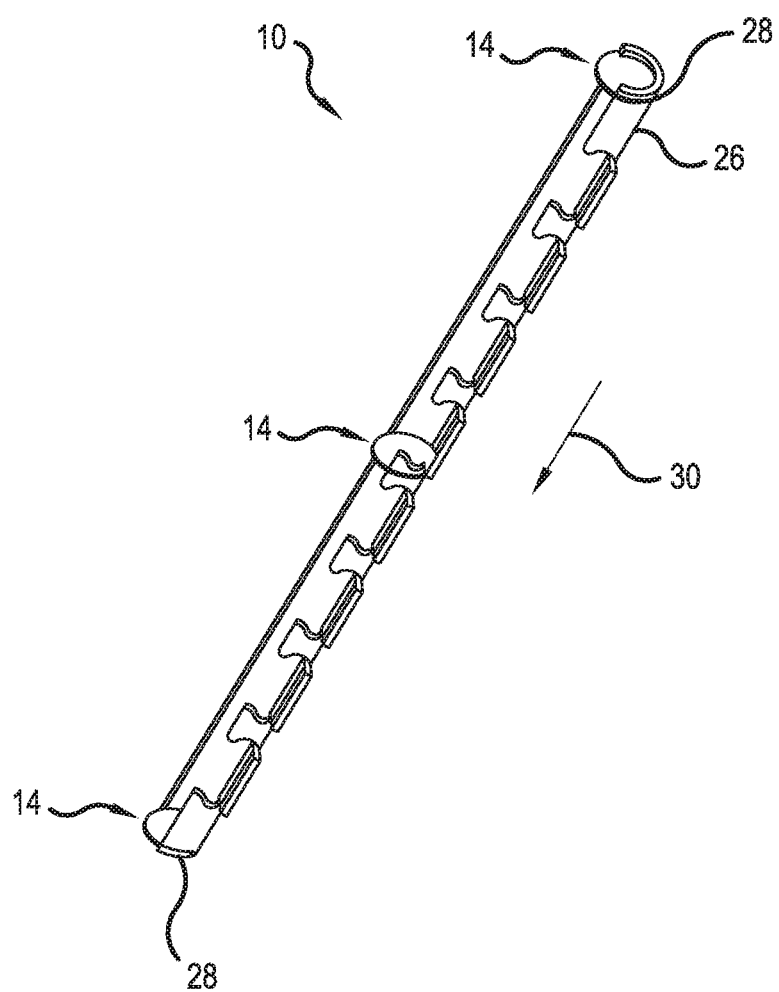
FIG. 2 shows a manifold bottom part with inserted partition walls in a perspective illustration.

FIG. 2 shows manifold bottom part 10. Partition walls 14 are inserted in slot-shaped recesses 28 and extend preferably at right angles to wall 26. Preferably, partition walls 14 extend in a plane running perpendicular to manifold extension direction 30. Partition walls 14 divide manifold bottom part 10 into two or more halves. Preferably, manifold 16 is thus divided into two or more halves.

Figure 3:
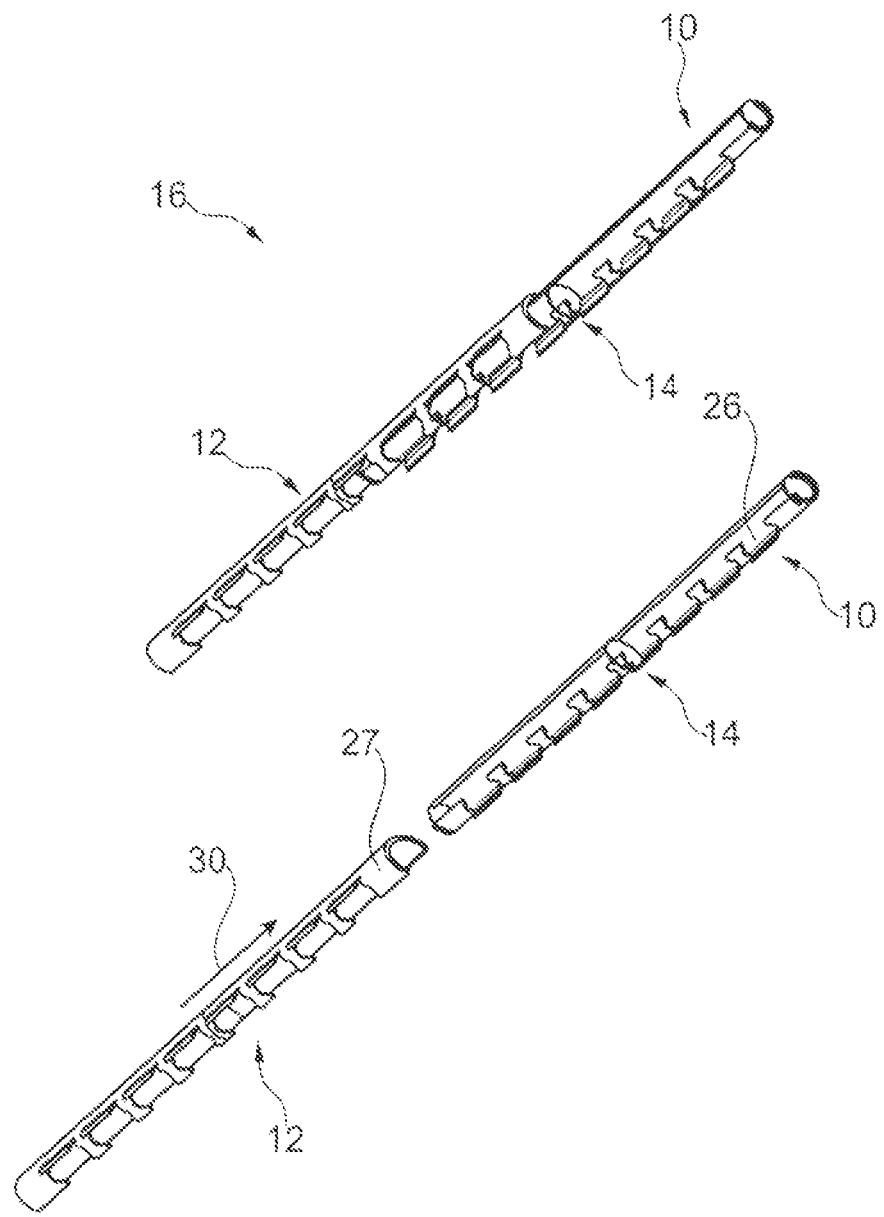
FIG. 3 shows a perspective illustration of the procedure: pushing in of the manifold bottom part into the manifold top part.

FIG. 3 shows in a perspective illustration manifold 16 during the assembly process. Manifold bottom part 10 and manifold top part 12 are pushed into one another in extension direction 30 of manifold 16. Manifold top part 12 hereby encircles manifold bottom part 10 in sections, and wall 27 of manifold top part 12 in sections surrounds wall 26 of manifold bottom part 10.

Figure 4:
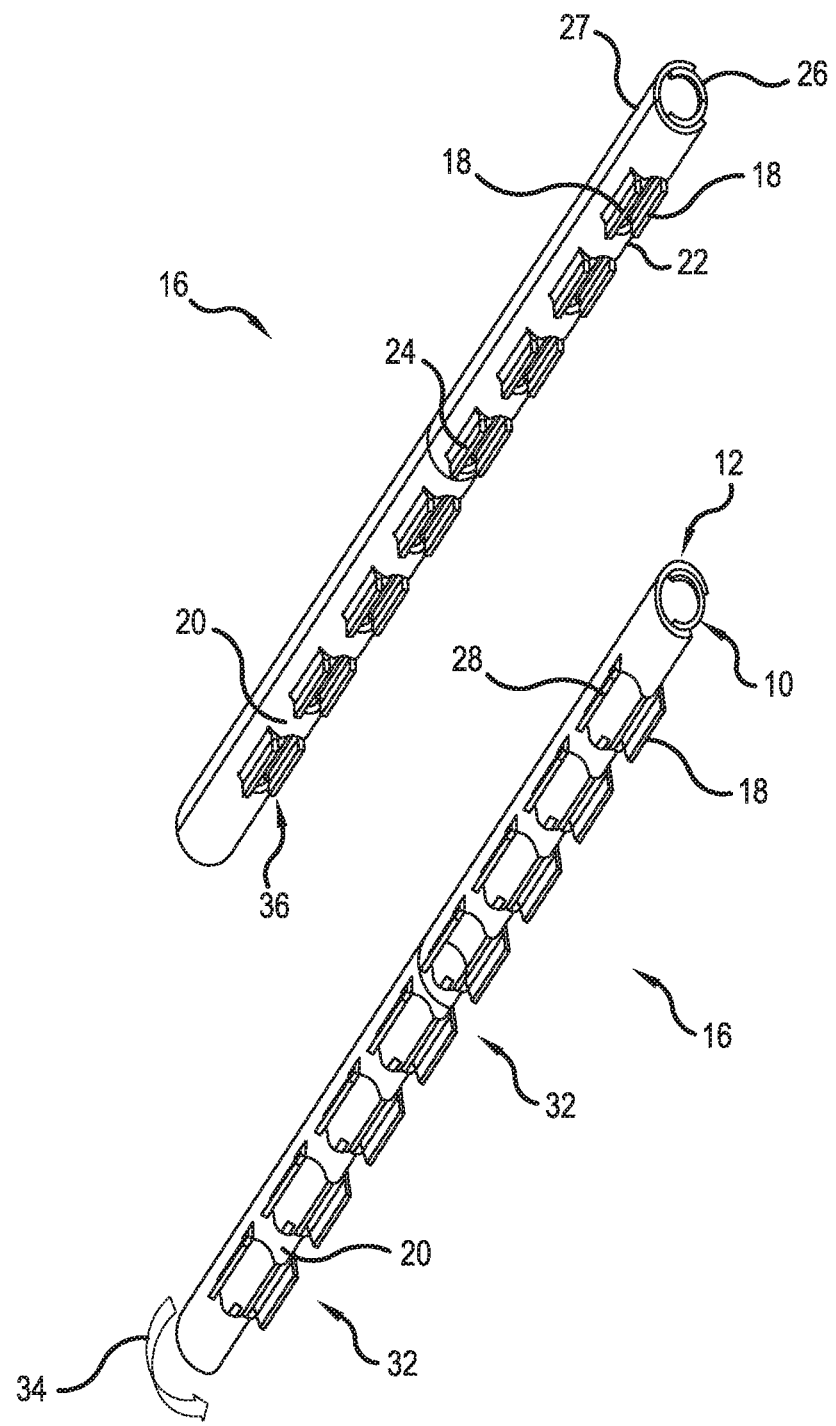
FIG. 4 shows a perspective illustration of the manifold bottom part pushed into the manifold top part and of the manifold bottom part twisted relative to the manifold top part.

FIG. 4 shows manifold 16 in the assembled state. Manifold bottom part 10 and manifold top part 12 are completely slipped one over the other. In this regard, wall 26 and wall 27 are substantially parallel to one another. Outwardly extending protrusions 18 in manifold 16 in the bottom portion of the figure are arranged at a greater distance to one another than in the top portion of the figure, whereby wall sections 20 are not oriented parallel to one another. Twisting of manifold bottom part 10 relative to manifold top part 12 can change a first position 32 of outwardly extending protrusions 18 to one another. The twisting process is illustrated with an arrow 34. In the case of manifold 16 shown in the top part of the figure, the surface sections are in a second position 36, whereby wall sections 20 are arranged substantially parallel to one another. Surface elements 24 have a substantially parallel orientation to one another. In this arrangement, tubes that are not shown can be arranged on manifold 16. Outwardly extending protrusions 18 with interspaces 22 arranged between them preferably form a passage geometry of manifold 16. The tubes arranged in manifold 16 are shown in FIG. 5 and described in greater detail in the associated description of the figure.

Figure 5:
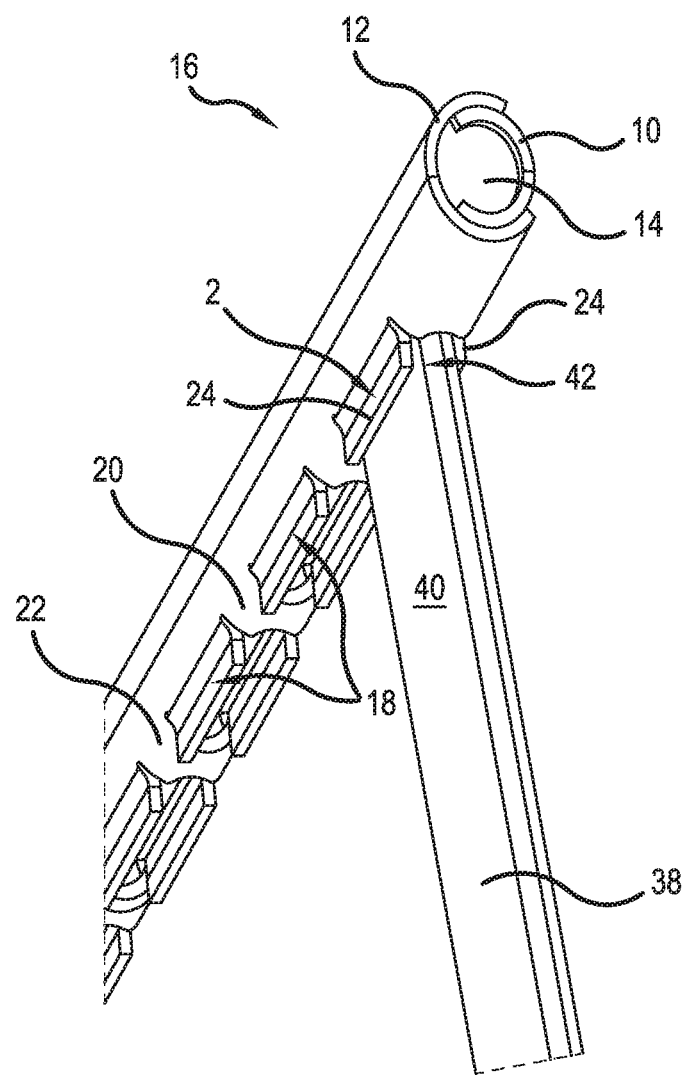
FIG. 5 shows a perspective illustration of the manifold with assembled flat tubes.

FIG. 5 shows a section of manifold 16 with outwardly extending protrusions 18, whereby a tube 38 is arranged between two opposite surface sections 24. Tube 38 in this exemplary embodiment is formed as a flat tube 38. Flat tube 38 lies against manifold 16 with an outer wall 40 at a tube end 42 on both sides substantially between surface sections 24. Manifold 16 is closed with one of partition walls 14. Tube 38 can also be a round tube having a circular cross-sectional area or an oval tube 38 having an oval cross-sectional area. In these cases, surfaces element 24 is not formed planar, but describes a concave form whose radius follows the form of the radius of tube 38.

Figure 6:
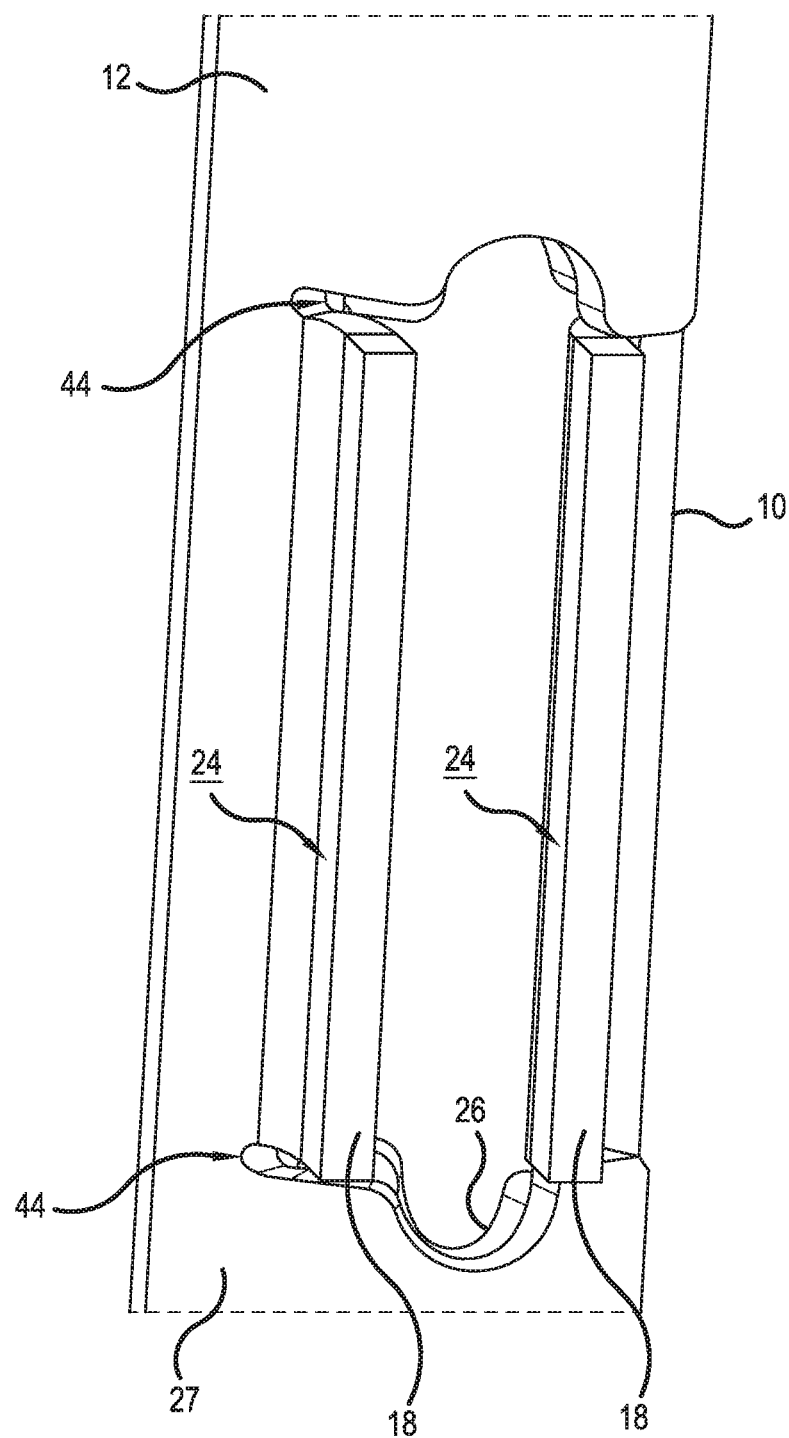
FIG. 6 shows a detail of the manifold with covered punched slots in a schematic illustration.

FIG. 6 in schematic illustration shows a detail in the area of outwardly extending protrusion 18, whereby two outwardly extending protrusions 18 are arranged opposite each other. Punched slots 44 can be seen, which were produced by the production process of manifold bottom part 10 and of manifold top part 12. Punched slots 44 can be covered in areas by wall 26 and wall 27 and are thus closed. Punched slot 44 of manifold bottom part 10 is hereby covered by wall 27 of manifold top part 12 and vice versa.

The production process or also the assembly process for putting together a heat exchanger can include the following steps: providing a manifold bottom part 10 and a manifold top part 12 with outwardly extending protrusions 18 and wall sections 20; inserting partition walls 14 into slot-shaped recesses 28; pushing manifold bottom part 10 and manifold top part 12 into one another; twisting manifold bottom part 10 relative to manifold top part 12 in the arrow direction 34; pushing tubes 38 in between surface elements 24 of outwardly extending protrusions 18; and connecting by soldering or gluing manifold bottom part 10 and manifold top part 12 and tubes 38.

Thus, a fluid-tight connection is realized between manifold 16 and tubes 38 of the tube/fin bundle of the heat exchanger.

The heat exchanger can be used, for example, for the temperature control of battery systems in electric and/or hybrid vehicles. However, the heat exchanger in general can also be used for cooling or heating assemblies and structural components. In this regard, thermal energy accumulating during the combustion process of the internal combustion engine can be removed via the heat exchanger and used, for example, for the climate control of a vehicle interior.

Alternatively or in addition, the heat exchanger can also be used for other applications in which a fluid is used for heat transfer.

Tubes 38 and manifold 16 and manifold bottom part 10 and manifold top part 12 can be produced of an aluminum material or an aluminum alloy. Alternatively, individual parts can also be produced of a suitable plastic.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger for a motor vehicle, the heat exchanger comprising:
   at least one tube through which a coolant is adapted to flow;
   at least one manifold into which the coolant, corning out of the at least one tube, flows, the at least one manifold having a manifold top part and a manifold bottom part; and
   outwardly extending protrusions forming a passage geometry for receiving the at least one tube, are formed on the manifold top part and the manifold bottom part,
   wherein punched slots in the manifold top part are covered on an inside by a wall section of the manifold bottom part,
   wherein punched slots in the manifold bottom part are covered on an outside by a wall section of the manifold top part, and
   wherein the punched slots of the manifold top part and the punched slots of the manifold bottom part are slots provided on each side, in a longitudinal extension direction of the manifold, of each of the outwardly extending protrusions at a base portion thereof.

2. The heat exchanger according to claim 1, wherein the manifold top part and the manifold bottom part each have a row of the outwardly extending protrusions, which in each case form a side of the passage geometry of openings for receiving the at least one tube.

3. The heat exchanger according to claim 2, wherein the at least one tube is a flat tube having two narrow sides and two broad sides, and wherein each of the outwardly extending protrusions extend in the longitudinal extension direction of the manifold, such that when the at least one tube is received in one of the openings, one of the two broad sides of the at least one tube directly contacts one of the outwardly extending protrusions of the manifold top part and another one of the two broad sides of the at least one tube directly contacts one of the outwardly extending protrusions of the manifold bottom part.

4. The heat exchanger according to claim 1, wherein the outwardly extending protrusions are separated from one another by interspaces having wall sections of the manifold top part and/or of the manifold bottom part.

5. The heat exchanger according to claim 4, wherein dimensions of the interspaces, viewed in the longitudinal extension direction of the manifold, are smaller than dimensions of the outwardly extending protrusions.

6. The heat exchanger according to claim 1, wherein the at least one tube is a flat tube.

7. The heat exchanger according to claim 1, wherein the at least one tube is a round tube.

8. The heat exchanger according to claim 1, wherein the at least one manifold has partition walls that are arranged perpendicular to the longitudinal extension direction of the at least one manifold.

9. The heat exchanger according to claim 8, wherein the partition walls are inserted in slot-shaped recesses in a manifold wall of the manifold bottom part.

10. The heat exchanger according to claim 1, wherein the manifold top part and/or the manifold bottom part, viewed in cross section, are formed semicircular, oval, or bounded by a polygonal shape.

* * * * *